(12) United States Patent
Kim et al.

(10) Patent No.: US 8,774,815 B2
(45) Date of Patent: Jul. 8, 2014

(54) METHOD AND APPARATUS FOR ALLOCATING RESOURCE

(75) Inventors: Eun-Kyung Kim, Anseong-si (KR); Kyung-Soo Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 310 days.

(21) Appl. No.: 12/670,770

(22) PCT Filed: Apr. 29, 2008

(86) PCT No.: PCT/KR2008/002434
§ 371 (c)(1),
(2), (4) Date: Jan. 26, 2010

(87) PCT Pub. No.: WO2009/020273
PCT Pub. Date: Feb. 12, 2009

(65) Prior Publication Data
US 2010/0226323 A1    Sep. 9, 2010

(30) Foreign Application Priority Data

Aug. 9, 2007   (KR) .................. 10-2007-0080062

(51) Int. Cl.
*H04J 9/00* (2006.01)
*H04L 12/28* (2006.01)
*H04W 4/00* (2009.01)
*H04J 3/16* (2006.01)

(52) U.S. Cl.
USPC ........ 455/450; 455/451; 455/452.1; 370/204; 370/255; 370/329; 370/437

(58) Field of Classification Search
CPC .. H04B 7/0632; H04L 5/0007; H04L 5/0073; H04L 25/0204
USPC ............... 455/450, 451, 452.1; 370/204, 255, 370/329, 437
See application file for complete search history.

(56) References Cited

U.S. PATENT DOCUMENTS

| | | | |
|---|---|---|---|
| 7,392,054 | B2 | 6/2008 | Cho et al. |
| 2004/0190482 | A1* | 9/2004 | Baum et al. ............. 370/347 |
| 2005/0201327 | A1 | 9/2005 | Kim et al. |
| 2007/0213070 | A1* | 9/2007 | Kim et al. ............. 455/452.2 |

FOREIGN PATENT DOCUMENTS

| | | |
|---|---|---|
| KR | 10-2005-0092145 A | 9/2005 |
| KR | 10-2005-0114589 A | 12/2005 |
| KR | 10-2006-0038786 A | 5/2006 |
| KR | 10-2006-0060221 A | 6/2006 |
| KR | 10-0736728 B1 | 7/2007 |
| KR | 10-2007-0082662 A | 8/2007 |
| WO | 2006/059827 A1 | 6/2006 |
| WO | 2008/035840 A2 | 3/2008 |

* cited by examiner

Primary Examiner — Rafael Pérez-Gutiérrez
Assistant Examiner — Joshua Schwartz
(74) Attorney, Agent, or Firm — Jefferson IP Law, LLP

(57) ABSTRACT

The present invention relates to a resource allocation method and a resource allocation apparatus. When the resource allocation apparatus according to the present invention receives information of a plurality of bands selected from a plurality of mobile stations operating in a band adaptive modulation and coding mode, depending on the channel status, the apparatus arranges the mobile stations on the basis of the maximum number of logically adjacent bands included in the band information, and allocates the resource on the basis of the order of the arranged mobile stations.

10 Claims, 1 Drawing Sheet

METHOD AND APPARATUS FOR ALLOCATING RESOURCE

TECHNICAL FIELD

The present invention relates to method and apparatus for allocating a resource. In particular, the present invention relates to method and apparatus for allocating a resource to a mobile station that operates in a band adaptive modulation and coding (band AMC) mode.

BACKGROUND ART

The adaptive modulation and coding (AMC) mode refers to a data transmission method that determines the modulation scheme and the coding scheme of different data channels depending on the channel status between cells, that is, a base station BS and a mobile station MS, to improve the usability of all cells.

In the case of recent mobile communication systems such as IEEE 802.16 WirelessMAN (wireless metropolitan area network) based WiBro (Wireless Broadband), in order to improve the data transmission speed, a band AMC scheme that distinguishes a better channel and a worse channel depending on the status of the subchannels, and allocates the subchannels to the mobile stations within a range permitted by the resource, is used. When the mobile station transmits data in a band that is allocated by the band AMC scheme, the data can be transmitted using a band having high-quality subchannels. Therefore, it is possible to transmit data stably against noise and interference from adjacent cells, and to increase the coding rate, which improves the transmission speed.

However, there is a case in which the band that is allocated to the mobile station operating in the band AMC mode should be changed due to the status of the subchannels that varies depending on a time change and mobility of the mobile station. That is, the mobile station reconstructs the band for band AMC by periodically measuring CINR (carrier to interference and noise ratio) to check the channel status of the subchannels, to include subchannels having a good status and exclude the subchannels having a bad status. In this case, the mobile station requests that the base station allocates the new band for the band AMC so as to communicate in the reconstructed band.

In the meantime, according to the method that allocates the band requested by the mobile station operating in the band AMC mode to the mobile station, the mobile station selects the band to be allocated on the basis of the channel status of the subchannels. In this case, the allocation of a logically non-adjacent band may be un-desirably requested. As described above, when the allocation of the logically non-ADJACENT bands is repeated, the overhead of MAP is increased. Accordingly, the base station cannot efficiently allocate the resources, nor can it allocate the resources to the other mobile stations due to the allocated band.

DISCLOSURE OF INVENTION

Technical Problem

The present invention has been made in an effort to provide a method and apparatus that is capable of efficiently allocating a resource to a mobile station that operates in a band adaptive modulation and coding (band AMC) mode.

Technical Solution

According to an aspect of the present invention, a method for allocating a resource to at least one mobile station operating in a band adaptive modulation and coding mode may include: creating a resource allocation list on the basis of band information received from the at least one mobile station; changing the mobile station order and the band order included in the resource allocation list on the basis of the maximum number of adjacent bands included in the band information; and allocating the resource on the basis of the mobile station order and the band order.

Further, according to another aspect of the present invention, a method for allocating a resource to at least one mobile station operating in a band adaptive modulation and coding mode may include: extracting band information to be allocated to the at least one mobile station from the band information received from the at least one mobile station; determining the allocation order of bands to be allocated to the at least one mobile station and respective mobile stations on the basis of the maximum number of adjacent bands included in the allocation band information; checking whether the band included in the allocation band is an previously allocated band, on the basis of the allocation order; when the included band is not the previously allocated band, allocating the included band on the basis of the allocation order; and changing the allocation order by deleting the included band from the allocation bands.

According to still another aspect of the present invention, an apparatus for allocating a resource may include: a resource request checking unit that generates a resource allocation list on the basis of band information received from at least one mobile station that operates in a band adaptive modulation and coding mode; an arranging unit that calculates the maximum number of adjacent bands for every mobile station included in the resource allocation list and rearranges the mobile station order and the band order included in the resource allocation list on the basis of the maximum number of bands; an allocation resource checking unit that checks whether the band included in the resource allocation list is an previously the allocated band, on the basis of the mobile station order and the band order, and when the band is not the previously allocated band, outputs information of the band and the mobile station to which the band is allocated; and an allocating unit that allocates the resource on the basis of the information of the band and the mobile station information.

According to an exemplary embodiment of the present invention, a mobile station that operates in a band adaptive modulation and coding (band AMC) mode reports the bands selected depending on the channel status, and sequentially allocates the resources to the mobile stations in the order of the maximum number of logically adjacent bands included in the band information, which reduces allocation of non-adjacent bands to increase the resource allocation efficiency.

Advantageous Effects

As described above, when the band information is received from the mobile station operating in the band AMC mode, the method that allocates the resource from the mobile station having a large maximum number of logically adjacent bands minimizes the inefficient resource allocation that allocates the non-adjacent bands.

MODE FOR THE INVENTION

Figure 1:
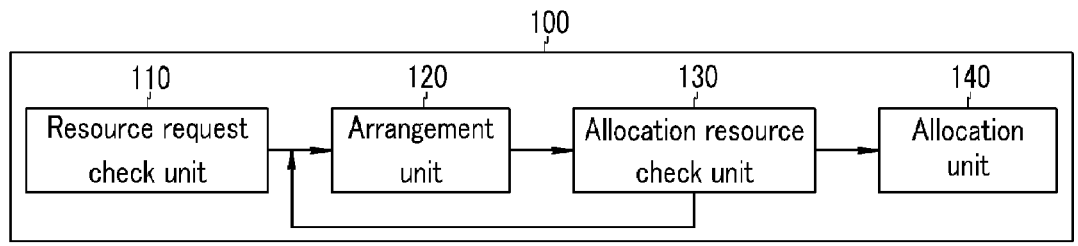
FIG. 1 is a configuration diagram showing a resource allocation apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification and the claims, unless explicitly described to the contrary, the term "comprise" and variations such as "comprises" or "comprising" will be understood to imply the inclusion of stated elements but not the exclusion of any other elements. Further, terms such as "~unit" used herein mean one unit that processes a specific function or operation, and may be implemented by hardware or software and a combination thereof.

In this specification, the mobile station MS may refer to a terminal, a mobile terminal MT, a subscriber station SS, a portable subscriber station PSS, user equipment UE, and an access terminal AT, and includes all or some functions of a mobile terminal, a subscriber station, a portable subscriber station, and user equipment.

In this specification, the base station BS may refer to an access point AP, a radio access station RAS, a node B, a base transceiver station BTS, an MMR (mobile multi-hop relay)-BS, and includes all or some functions of the access point, the wireless access station, the node B, the base transceiver station, the MMR-BS, and so on.

Hereinafter, method and apparatus for allocating a resource according to an exemplary embodiment of the present invention will be described in detail with reference to the accompanying drawings.

The exemplary embodiment of the present invention relates to method and apparatus for allocating the resource to a mobile station that operates in band AMC mode, and this embodiment is applied not only when the mobile station enters in the band AMC mode to request the resource allocation, but when the mobile station requests to reallocate the resource.

FIG. 1 is a configuration diagram showing a resource allocation apparatus according to an exemplary embodiment of the present invention.

Referring to FIG. 1, the resource allocation apparatus 100 includes a resource request check unit 110, an arrangement unit 120, an allocation resource check unit 130, and an allocation unit 140.

The resource request check unit 110 receives band information in which it is determined that the channel status is good, from at least one mobile station (not shown) that operates in the band AMC mode, and generates a resource allocation list that classifies the bands requested to be allocated to mobile stations on the basis of the received band information and outputs it.

The arrangement unit 120 receives the resource allocation list from the resource request check unit 110 or the allocation resource check unit 130, and checks whether bands that are logically adjacent to each other are present, among the bands classified to respective mobile stations. Further, when there are logically adjacent bands, the arrangement unit 120 calculates the numbers of bands logically adjacent with respect to the respective mobile states having the logically adjacent bands, and then selects the maximum of the calculated numbers of bands. Hereinafter, the maximum is referred to as a maximum number of band. That is, the arrangement unit 120 calculates the maximum number of band with respect to each of the mobile stations having logically adjacent bands, and thereby has a plurality of maximum numbers of bands.

Specifically, the mobile stations are arranged such that a mobile station having the largest of the maximum band numbers is positioned first, and a mobile station having the smallest, for example, "0" of the maximum bands is positioned last. Further, the arrangement unit 120 rearranges the order of bands that is included in the resource allocation list on the basis of the order of the mobile stations arranged as described above, and then outputs it.

The allocation resource check unit 130 checks whether each of the bands included in the resource allocation list are an previously allocated band or not, on the basis of the order of the bands included in the resource allocation list input from the arrangement unit 120. As a result, when the corresponding band is the previously allocation band, the allocation resource check unit 130 deletes the corresponding band from the input resource allocation list, and outputs the corrected resource allocation list to the arrangement unit 120. in contrast, when the corresponding band is not the previously allocated band, the allocation resource check unit 130 transmits information of the corresponding band and the mobile station where the corresponding band is allocated, to the allocation unit 140 to allocate the resource, deletes the corresponding bands from the resource allocation list, and then outputs the corrected resource allocation list to the arrangement unit 120. Therefore, the arrangement unit 120 arranges the mobile stations again on the basis of the corrected resource allocation list, and outputs the rearranged resource allocation list to the allocation resource check unit 130 again. The allocation resource check unit 130 checks whether the bands are the previously allocated bands or not, on the basis of the order of the input resource allocation list. As such, the process that rearranges the resource allocation list and excludes the previously allocated bands on the basis of the maximum number of logically adjacent bands is repeated until the allocation process for all of the bands included in the resource allocation list is completed.

The allocation unit 140 allocates the resources on the basis of the information of the mobile station and the bands that are output in turns from the allocation resource check unit 130.

Figure 2:
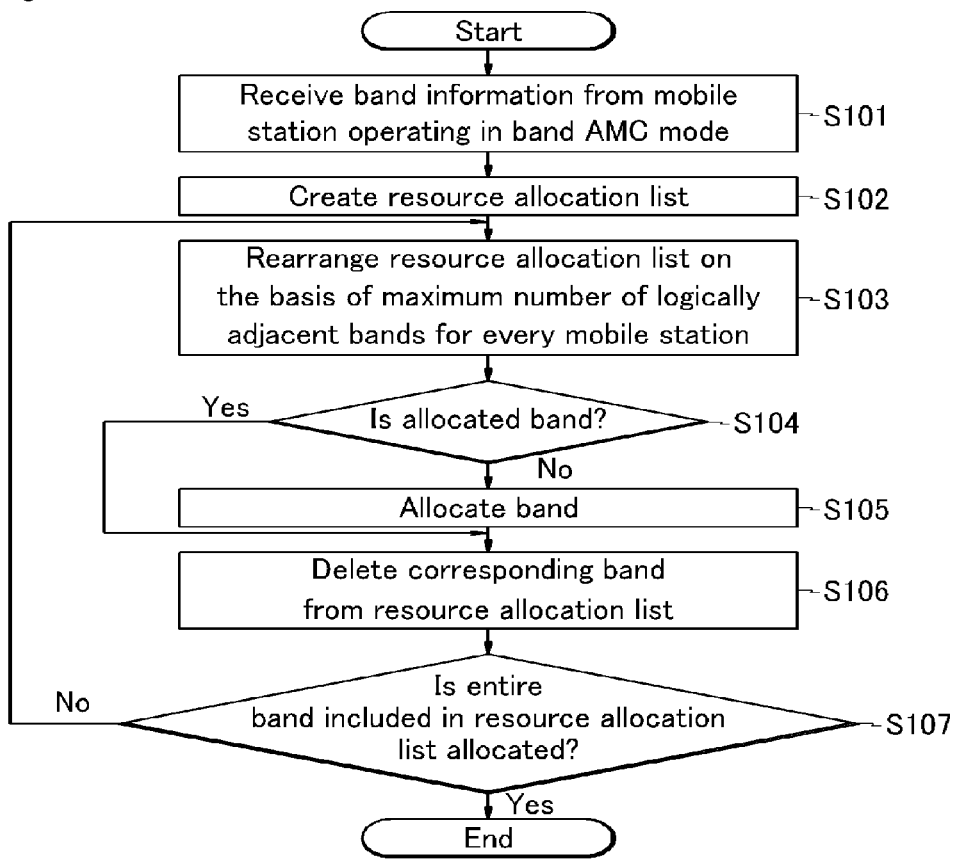
FIG. 2 is a flowchart showing a resource allocation method according to another exemplary embodiment of the present invention.

FIG. 2 is a flowchart showing the resource allocation method according to an exemplary embodiment of the present invention, and specifically, it shows the resource allocation method that allocates the resources to the mobile stations operating in the band AMC mode.

Referring to FIG. 2, the resource allocation apparatus 100 receives band information that is selected depending on the channel status, from at least one mobile station operating in the band AMC mode (S101), extracts the band to be allocated to the mobile stations from the received band information, and generates the resource allocation list that arranges the above (S102). In this case, the band information received from the mobile station is information of the bands that are selected in the order from the best channel among a plurality of channels.

When the resource allocation list is generated, the resource allocation apparatus 100 calculates the maximum number of logically adjacent bands for every mobile station on the basis of the resource allocation list. Further, on the basis of the maximum number of bands that is calculated for the mobile station, the mobile stations are arranged in the order of the maximum number of bands, and the resource allocation list is rearranged in the order of the arranged mobile stations (S103).

Thereafter, the resource allocation apparatus 100 checks whether the bands included in the resource allocation list are previously allocated bands or not on the basis of the order of the bands included in the rearranged resource allocation list (S104). As the result of checking, when the corresponding band is not the previously allocated band, the corresponding band is allocated to a mobile station corresponding to the allocation order (S105). In this case, the allocation order is based on the order of mobile stations included in the resource allocation list and the order of bands to be allocated to the mobile stations. In the meantime, when the corresponding band is the previously allocated band or the band allocation is completed in step S105, the resource allocation apparatus 100 deletes the corresponding band from the resource allocation list (S106). Further, the steps S103 to S106 are repeated for the resource allocation list in which the corresponding band is deleted. The above steps are repeatedly performed until all of the bands included in the resource allocation list are completely allocated (S107).

The above-described exemplary embodiments of the present invention can be applied to programs that allow computers to execute functions corresponding to the configurations of the exemplary embodiments of the invention or recording media including the programs as well as the above-described method and apparatus. Those skilled in the art can easily implement the applications from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for allocating a resource to at least one mobile station operating in a band Adaptive Modulation and Coding (AMC) mode, the method comprising:
   receiving, from the at least one mobile station, band information for channel bands determined to have a good channel status;
   creating a resource allocation list on the basis of the band information received from the at least one mobile station;
   changing a mobile station order and a band order included in the resource allocation list on the basis of the maximum number of bands that are logically adjacent included in the band information; and
   allocating resources to at least one mobile station operating in an AMC mode on the basis of the mobile station order and the band order so as to allocate resources to a mobile station having a relatively larger number of logically adjacent bands included in the associated band information before allocating resources to a mobile station having a relatively smaller number of logically adjacent bands included in the associated band information,
   wherein the allocating includes:
      determining whether the bands included in the resource allocation list are previously allocated bands in turn, on the basis of the band order;
      when the included band is not the previously allocated band, allocating the included bands on the basis of the mobile station order; and
      repeating the determining of whether the bands are the previously allocated bands, and
      the allocating of the resource on the basis of the mobile station order, until all of the bands included in the resource allocation list are allocated.

2. The method of claim 1, wherein the allocating further includes, between the allocating on the basis of the mobile station order and the repeating:
   deleting the included band from the resource allocation list; and
   changing the mobile station order and the band order on the basis of the resource allocation list in which the included band is deleted.

3. The method of claim 1, wherein in the changing of the mobile station order, the mobile station order is determined to correspond to a descending order of the maximum number of bands that are logically adjacent.

4. The method of claim 1, wherein the band information includes information relating to the status of the corresponding band.

5. The method of claim 4, wherein the creating of the resource allocation list comprises:
   determining a relative strength of each band based on the corresponding band information of each band.

6. The method of claim 1, wherein the changing comprises:
   arranging the mobile stations in an order of the maximum number of bands that are logically adjacent; and
   rearranging the resource allocation list in the order of the arranged mobile stations.

7. A resource allocation method that allocates a resource to at least one mobile station operating in a band Adaptive Modulation and Coding (AMC) mode, the method comprising:
   receiving, from the at least one mobile station, band information for channel bands determined to have a good channel status;
   extracting band information to be allocated to the at least one mobile station from the band information received from the at least one mobile station;
   determining an allocation order of bands to be allocated to the at least one mobile station and respective mobile stations on the basis of the maximum number of bands that are logically adjacent included in the allocation band information;
   determining whether the band included in the allocation band is a previously allocated band, on the basis of the allocation order;
   when the included band is not the previously allocated band, allocating the included band to at least one mobile station operating in an AMC mode on the basis of the allocation order so as to allocate resources to a mobile station having a relatively larger number of logically adjacent bands included in the associated band information before allocating resources to a mobile station having a relatively smaller number of logically adjacent bands included in the associated band information; and
   changing the allocation order by deleting the included band from the allocation bands; and
   repeating the determining of whether the bands are previously allocated bands, allocating the included band, and changing the allocation order until all of the bands to be allocated are allocated.

8. An apparatus for allocating a resource, comprising:
   a resource request checking unit that receives, from at least one mobile station that operates in an Adaptive Modulation and Coding (AMC) mode, band information for channel bands determined to have a good channel status, and generates a resource allocation list on the basis of the band information received from the at least one mobile station;

an arranging unit that calculates the maximum number of bands that are logically adjacent for every mobile station included in the resource allocation list and rearranges a mobile station order and a band order included in the resource allocation list on the basis of the maximum number of bands that are logically adjacent;

an allocation resource checking unit that checks whether the band included in the resource allocation list is a previously allocated band, on the basis of the mobile station order and the band order, and when the band is not the previously allocated band, outputs information of the band and the mobile station to which the band is allocated; and an allocating unit that allocates resources to at least one mobile station operating in an AMC mode on the basis of the information of the band and the mobile station information so as to allocate resources to a mobile station having a relatively larger number of logically adjacent bands included in the associated band information before allocating resources to a mobile station having a relatively smaller number of logically adjacent bands included in the associated band information, wherein the allocation unit determines whether the bands included in the resource allocation list are previously allocated bands in turn, on the basis of the band order, allocates the included bands on the basis of the mobile station order when the included band is not the previously allocated band, and repeats the determining of whether the bands are the previously allocated bands and the allocating of the resource on the basis of the mobile station order, until all of the bands included in the resource allocation list are allocated.

9. The apparatus of claim 8, wherein the allocation resource checking unit deletes the band from the resource allocation list, and outputs the resource allocation list in which the band is deleted to the arranging unit.

10. The apparatus of claim 8, wherein the arranging unit arranges the mobile stations in an order of the maximum number of bands that are logically adjacent and rearranges the resource allocation list in the order of the arranged mobile stations.

* * * * *